United States Patent
Van Heeswyk et al.

(10) Patent No.: US 7,170,943 B1
(45) Date of Patent: Jan. 30, 2007

(54) CONTROL CHANNEL FOR A WIRELESS DIGITAL SUBSCRIBER LINE SYSTEM

(75) Inventors: Frank Van Heeswyk, Toronto (CA); Ramesh Mantha, Toronto (CA); Martin Snelgrove, Toronto (CA)

(73) Assignee: SOMA Networks, Inc., San Francisco, CA (US)

( * ) Notice: Subject to any disclaimer, the term of this patent is extended or adjusted under 35 U.S.C. 154(b) by 732 days.

(21) Appl. No.: 09/722,499

(22) Filed: Nov. 28, 2000

(30) Foreign Application Priority Data

Jun. 30, 2000  (CA) .................................. 2313314

(51) Int. Cl.
*H04L 27/00* (2006.01)
(52) U.S. Cl. ...................... 375/259; 370/329; 455/450; 455/511
(58) Field of Classification Search ................ 375/259, 375/260, 257, 377; 370/278, 282, 294, 336, 370/337, 347, 348, 442, 322, 329, 330, 335, 370/342, 345; 455/450, 451, 452.1, 509, 455/464, 511
See application file for complete search history.

(56) References Cited

U.S. PATENT DOCUMENTS

| | | | | |
|---|---|---|---|---|
| 4,797,879 A | * | 1/1989 | Habbab et al. | 398/51 |
| 5,299,198 A | * | 3/1994 | Kay et al. | 370/347 |
| 5,390,366 A | * | 2/1995 | Kasugai | 455/524 |
| 5,539,730 A | * | 7/1996 | Dent | 370/280 |
| 5,703,881 A | * | 12/1997 | Kay et al. | 370/468 |
| 5,719,859 A | * | 2/1998 | Kobayashi et al. | 370/347 |
| 5,729,541 A | * | 3/1998 | Hamalainen et al. | 370/337 |
| 5,862,486 A | * | 1/1999 | Przelomiec | 455/454 |
| 5,881,061 A | * | 3/1999 | Iizuka et al. | 370/337 |
| 5,917,826 A | * | 6/1999 | Naessl et al. | 370/442 |
| 5,933,418 A | | 8/1999 | Massingill et al. | |
| 5,956,329 A | * | 9/1999 | Pernice et al. | 370/336 |
| 6,011,786 A | * | 1/2000 | Dent | 370/330 |
| 6,028,853 A | * | 2/2000 | Haartsen | 370/338 |

(Continued)

FOREIGN PATENT DOCUMENTS

EP  0 831 669 AW  3/1998

(Continued)

OTHER PUBLICATIONS

"Microcellular Personal Multimedia Communications System with Connectionless Communication Capability"—Publication Date: Apr. 5, 1997, 47th. Vehicular Technology Conference, Phoenix, IEEE, vol. 3 Conf. 47, May 4-7, 1997, pp. 1972-1976, XP000738708.

*Primary Examiner*—Jean B. Corrielus
(74) *Attorney, Agent, or Firm*—Katten Muchin Rosenman LLP

(57) ABSTRACT

A user control channel for a wireless digital subscriber line systems and the like, or other communications systems which can benefit from a control channel which provides a low data rate connection between stations on an ongoing basis, makes efficient use of transmission capacity in the communications systems. In one embodiment, the user control channel has a structure employing slotted frames, and a user can be assigned multiple slots, a single slot or less than a single slot (sharing slots with other users) to meet the data transmission needs of the user. Also, one or more slots can be designated as random access slots which users can access via an Aloha-like or other random access protocol as needed.

9 Claims, 4 Drawing Sheets

U.S. PATENT DOCUMENTS

| | | | |
|---|---|---|---|
| 6,031,827 A * | 2/2000 | Rikkinen et al. | 370/330 |
| 6,415,410 B1 * | 7/2002 | Kanerva et al. | 714/749 |
| 6,519,461 B1 * | 2/2003 | Andersson et al. | 455/453 |
| 6,693,892 B1 * | 2/2004 | Rinne et al. | 370/348 |
| 6,724,740 B1 * | 4/2004 | Choi et al. | 370/335 |
| 6,747,963 B1 * | 6/2004 | Park et al. | 370/335 |
| 2001/0048714 A1 * | 12/2001 | Jha | 375/150 |

FOREIGN PATENT DOCUMENTS

| | | |
|---|---|---|
| WO | WO99/50977 | 10/1999 |
| WO | WO99/52307 | 10/1999 |

* cited by examiner

CONTROL CHANNEL FOR A WIRELESS DIGITAL SUBSCRIBER LINE SYSTEM

FIELD OF THE INVENTION

The present invention relates to a control channel for a wireless digital subscriber line (wDSL) system. More specifically, the present invention relates to a control channel which employs a relatively low amount of transmission capacity to achieve communication of at least desired control signals between base stations and subscriber stations in a wDSL system.

BACKGROUND OF THE INVENTION

Much interest has been expressed recently in providing voice and data local loop services via wireless systems. Wireless digital subscriber line (wDSL) systems are systems that connect subscribers to a public switched telephone network (PSTN) and/or other networks, such as the Internet, using radio signals to exchange information, as a substitute for copper wiring, over all or part of the connection between the subscriber and the switch and/or gateways and routers. Wireless local loop (WLL) systems have been installed in various locations to date, primarily third world or developing nations where the cost to establish a copper wire infrastructure for local loop services is very high. In more industrialized locations such as North America, including locations where a copper wire infrastructure already exists, great interest in wDSL also exists to provide competition in local access services.

Many WLL or wDSL systems developed and/or proposed to date build upon techniques and technologies developed for cellular mobile systems, including analog cellular and GSM or CDMA cellular. Such systems have proven to be very successful to date at providing mobile wireless communications and much development has been performed with respect to their technologies.

In such systems, control signals are generally transmitted between subscriber station and base station either through a random access channel (RACH), which operates under an Aloha-like random access protocol which is subject to collisions and other failures, or dedicated traffic channels (DTCHs), wherein system resources are reserved for the communication between the two devices. However, the design of RACH and DTCH in such cellular systems were driven by the typical operating characteristics of cellular telephones for voice communication, i.e.—most phones spend a great deal of their time idle and most connections, when they occur, last an average of three minutes. Channel setup thus occurs relatively infrequently and such a setup requires only a small amount of connection time/bandwidth relative to the typical three minute duration of the connection.

The present inventors have determined however, that while wDSL systems based upon mobile cellular technologies can provide reasonable voice performance, they do not provide bandwidth efficiencies that will be required for wDSL systems which are widely deployed and which provide voice and data services. RACH channels will quickly be saturated as numbers of users escalate and use of traffic channels for control signals will consume valuable transmission capacity that will be otherwise required for servicing users. Further, unlike voice, data transmissions are typically bursty and occur at many random times and conventional, cellular-type, set up requirements are excessive relative to the typically brief, bursty data transmissions.

It is therefore desired to have a system, apparatus and method to provide digital subscriber line services via wireless communications which better lends itself to large deployments.

SUMMARY OF THE INVENTION

It is an object of the present invention to provide a novel control channel for a wireless digital subscriber line and method therefor which obviates or mitigates at least some of the above-identified disadvantages of the prior art.

According to a first aspect of the present invention, there is provided a wireless communication system for communication between a base station and a plurality of subscriber stations, comprising:

an uplink channel structure for said plurality of subscriber stations to communicate with said base station and said uplink channel structure including a plurality of dedicated channels and a user control channel;

a downlink channel structure including a plurality of dedicated channels and at least one user control channel to communicate with subscriber stations to which no dedicated channel is allocated; and wherein said user control channel transmits data between said base station and at least one of said plurality of subscriber stations in frames having a first time duration, each said frame having a series of slots representing subsets of said first time duration and each subscriber station employing said user control channel being allocated at least a portion of a slot in said frames.

The present invention provides a novel user control channel for a wireless digital subscriber line system and the like, or other communications systems which can benefit from a control channel which provides a low data rate connection between stations on an ongoing basis and which makes efficient use of transmission capacity in the communications systems. The user control channel has a structure employing slotted frames, and a user can be assigned multiple slots, a single slot or less than a single slot (sharing slots with other users) to meet the data transmission needs of the user. Also, one or more slots can be designated as random access slots which users can access via an Aloha-like or other random access protocol as needled.

The present invention also provides a novel power control system for CDMA telecommunications systems wherein the rate of power updates can be changed, adaptively, as needed and up to date power control information is available, via the user control channel, to establish a dedicated channel between stations in an efficient manner.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
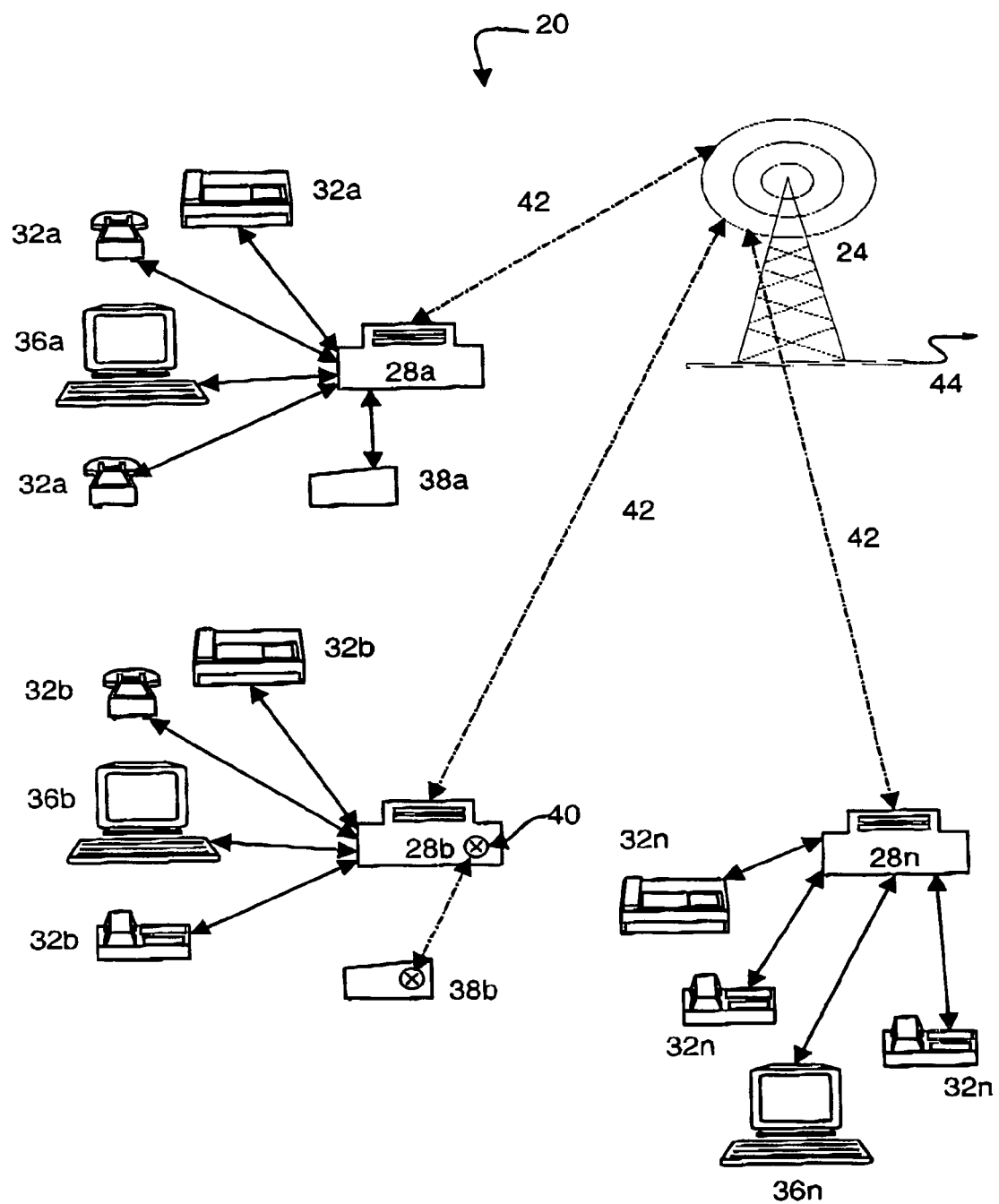
FIG. 1 shows a wireless digital subscriber line (wDSL) system in accordance with a embodiment of the present invention.

A CDMA telecommunication system is indicated generally at 20 in FIG. 1. System 20 is a wireless digital subscriber line (wDSL) system wherein a base station 24 communicates with a plurality of subscriber stations 28a, 28b . . . 28n. Each subscriber station 28 can be connected to one or more telephony devices 32, such as conventional telephones, facsimile machines, etc., and/or one or more data devices 36, such as a personal computer, an Internet appliance or other device, such as a burglar alarm 38, which requires a data connection to a device or system located elsewhere. A local radio device 40, such as a Bluetooth transceiver, can be provided to allow wireless communication between subscriber stations 28 and nearby data devices and/or telephony devices equipped with complementary radio transceivers.

Subscriber stations 28 communicate with base station 24 via a communication link 42 which, in this embodiment of the present invention, is a radio link employing CDMA as a multiplexing technology. Base station 24 is connected to other base stations and/or networks such as the public switched telephone network (PSTN) and the Internet by one or more backhauls 44, which can be T1, T3, OC3, microwave or other links suitable for use as a backhaul.

In system 20, subscriber stations 28 can be mobile units, such as cellular telephone handsets capable of receiving voice and/or data, but more preferably are fixed or nomadic, such as wDSL stations. In the preferred embodiment, in normal use subscriber stations 28 are not used in moving vehicles or by pedestrians and are maintained in a single location (fixed) when in use or are for nomadic, i.e.—subscriber station 28 moving from one fixed location to another between uses.

The present inventors have determined that, unlike mobile systems intended to primarily carry voice, such as IS-95-based systems or proposed systems such as CDMA 2000, 3GPP, etc., in a wDSL system such as system 20 there are significant advantages in having a control channel which allows exchange of at least a desired set of control signals between subscriber stations 28 and base station 24 even when no dedicated (voice or data) Connection is allocated between the subscriber station 28 and base station 24. While existing mobile systems which primarily carry voice do have paging and other control channels that a mobile unit can listen to, the mobile unit does not communicate with the base station when no dedicated connection is being set up or is occurring. The present invention provides advantages, which will be described further below, and include, but are not limited to: faster establishment of a dedicated communications channel between base station 24 and a subscriber station 28; effective open loop and closed loop power control; and efficient transfer of low data rate or low priority data between base station 24 and a subscriber station 28, etc.

Figure 2:
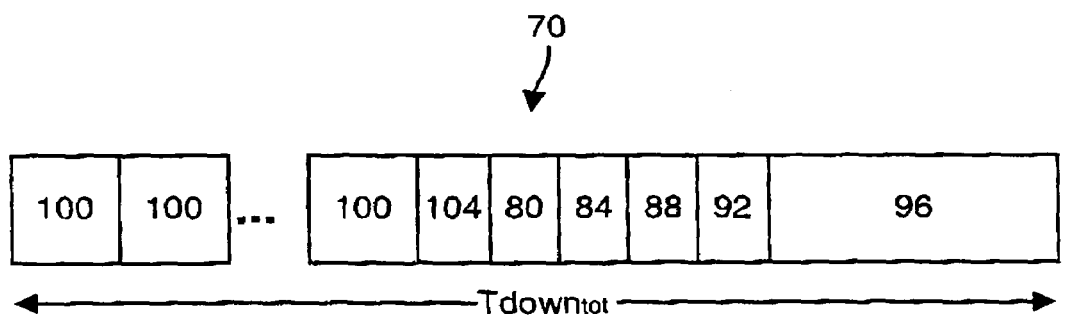
FIG. 2 shows a structure for the utilization of downlink transmission capacity in a wDSL system in accordance with an embodiment of the present invention.

Accordingly, in an embodiment of the present invention, radio link 42 is structured to provide both common control channels and user channels. FIG. 2 shows a structure 70 of the allocation of transmission capacity in the downlink direction of radio link 42. As used herein, the term transmission capacity is intended to comprise the ability of a telecommunication device to transmit data to a receiver. Depending upon the multiplexing technique employed, transmission capacity can include frequency, code space, etc.

Downlink structure 70 has a total transmission capacity of $Tdown_{tot}$ and the downlink common control channels include pilot channel 80, primary 84 and secondary 88 sync channels and a broadcast configuration channel 92, each of which can, for example, be similar to the proposed 3GPP channels serving these functions. Downlink structure 70 also includes user channels, such as shared data channel 96 which transmits data packets from base station 24 to appropriately addressed subscriber stations 28 in system 20 and a plurality of dedicated channels 100 which are assigned for communications between a subscriber station 28 and base station 24, as needed, where QoS requirements for the connection are more stringent. Dedicated channels 100 are bi-directional and thus also appear in the uplink structure 102 of radio channel 42, which is discussed below with reference to FIG. 3. The final user channels in the downlink are the bi-directional user control channels 104.

Figure 3:
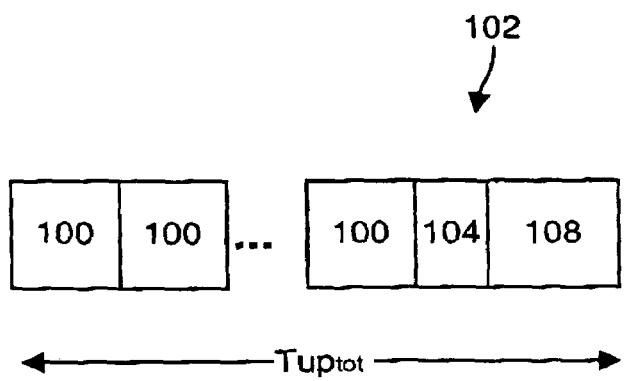
FIG. 3 shows a structure for the utilization of uplink transmission capacity in an uplink in a wDSL system in accordance with an embodiment of the present invention.

In FIG. 3 an uplink structure 102 is illustrated and has a total transmission capacity of $Tup_{tot}$. In FIG. 3 only a single user control channel 104 is shown, for clarity, but as will be apparent to those of skill in the art from the following discussion, in most cases radio link 42 will include more than one user control channel 104, the actual number of user control channels 104 being provided being related to the number of subscriber stations 28 in system 20 and/or their state (no user control channel need be available to a subscriber station 28 with a dedicated channel 100 assigned to it).

As mentioned above, FIG. 3 shows the uplink structure 102 of radio link 42. Structure 102 includes the above-described dedicated channels 100, one or more user control channels 104 and a random access channel 108, which is employed by a subscriber station 28 when it is powered on within system 20, to initialize itself with base station 24 and system 20. Random access channel 108 employs an Aloha-like random access protocol.

As used herein, the term bi-directional is intended to encompass any suitable method of associating an uplink channel with a downlink channel to enable two way communications between a subscriber station 28 and a base station 24. Examples include time division duplexing (TDD) and frequency division duplexing (FDD), the latter being the technique employed in PCS telephone systems such as GSM and IS-95 based systems. Thus, a dedicated downlink channel 100 in FIG. 2 has an associated uplink channel 100 in FIG. 3 and these two channels are referred to as a bi-directional channel.

With respect to user control channel 104, these bi-directional channels can also comprise different amounts of transmission capacity (i.e. slots, as discussed below) in different directions. For example, a subscriber station can have twice the transmission capacity assigned to it in the downlink part of the bi-directional user control channel 104 as it does in the uplink part of the bi-directional user control channel 104.

As will be apparent to those of skill in the art, FIGS. 2 and 3 are not drawn to scale and, for example, shared channel 96 will typically have significantly (e.g.—approaching an order of magnitude or more) more transmission capacity allocated to it than is allocated to the primary 84 and secondary 88 synchronization channels. Also, it is contemplated that in many embodiments of the present invention, the amount of transmission capacity of radio link 42 assigned to shared channel 96 will be adjusted to meet network requirements, by allocating or de-allocating transmission capacity to create or remove dedicated channels 100 as needed. When few dedicated channels 100 are needed, unused transmission capacity can be assigned to shared channel 96 to increase its capacity or vice versa.

User control channels 104 are established by system 20, as needed, and a portion of a user control channel 104 is allocated to each operating subscriber station 28 to communicate with its corresponding base station 24 in system 20 when the subscriber station 28 is activated within system 20 (for example, as part of a power on sequence of operations when a subscriber station 28 is powered up, as part of a reacquisition sequence of operations when a subscriber station 28 is again able to communicate with a base station 24 after a failure of radio link 42 to the base station 24, after a handoff of a subscriber station 28 from one base station 24 to another or after a subscriber station 28 comes out of a low power/sleep mode).

Once a portion of a user control channel 104 is allocated to a subscriber station 28, it is maintained during normal operation of system 20 until a dedicated channel 100 is established between the base station 24 and the subscriber station 28. While such a dedicated channel 100 is established between a subscriber station 28 and a base station 24, it will perform the transmission of control or other signals which were performed by user control channel 104 and thus the subscriber station 28 can release the resources of user control channel 104 that were allocated to it. Once the dedicated channel 100 is de-allocated from a subscriber station 28, a portion of user control channel 104 is re-allocated to the subscriber station 28 so that the transmission of the control and/or other signals is not interrupted.

As will be apparent to those of skill in the art, the transmission capacity (bandwidth, code space, etc.) of radio link 42 is limited and, with many subscriber stations 28 being served by each base station 24, must be managed carefully. Accordingly, user control channel 104 is designed to make effective use of the transmission capacity assigned to it.

Specifically, user control channel 104 is preferably implemented with a structure having a ten millisecond frame length and fifteen time slots, which is similar to that of the uplink DPDCH/DPCCH channels described in the 3GPP document, 3G TS 25.211 V3.1.1 (Dec. '99). In a present embodiment of the invention, a fixed spreading factor of five hundred and twelve is employed and each subscriber station 28 is assigned a slot, or portion of a slot, in a user control channel 104 whenever there are no dedicated channels 100 assigned to the subscriber station 28. This allows, for example, fifteen subscriber stations 28 to be serviced by one user control channel 104, each subscriber station 28 being provided with one of the fifteen available slots. Similarly, if three hundred subscriber stations 28 without dedicated channels 100 assigned to them are present in system 20, a total of twenty user channels 104 could be employed to assign one slot to each subscriber station.

As will be discussed in more detail below, it is also possible to assign more than one slot in a user control channel 104 to a subscriber station 28 when additional transmission capacity is required and/or desired for that subscriber station 28. This can be employed, for example, to permit low priority transfers of larger amounts of data, such as firmware upgrades to a subscriber station 28, through a user control channel 104. It is also possible to assign less than one slot in user control channel 104 to a subscriber station 28. In other words, a slot can be shared amongst subscriber stations 28 by, for example, allowing a first subscriber station 28 to transmit in the slot on odd numbered frames and a second subscriber station 28 to transmit in the same slot on even numbered frames, or by any other suitable sharing technique as will occur to those of skill in the art.

As will be apparent, by employing a slotted structure, the modem requirements in base station 24 are reduced as one modem is "shared" by the slots in a frame. Specifically, only one modem is required to process a frame, even though fifteen or more subscriber stations 28 can be communicating via that frame.

While user channels 104 are not random access, it is contemplated that one or more slots, preferably adjacent, can be designated to all, or a subset of all, subscriber stations 28 in system 20 as random access slots, thus allowing user control channel 104 to include a configurable amount of dedicated transmission capacity and random access transmission capacity. Each of these alternatives is discussed in more detail below.

In a present embodiment, which employs a channel design for user control channel 104 which is similar to the 3GPP uplink DPDCH/DPCCH channels, one slot is two thousand, five hundred and sixty chips (at a chip rate of 3.84 million chips per second) and thus, at a spreading factor of five hundred and twelve, a slot permits transmission of five symbols. Assuming a QPSK modulation scheme, these five symbols allow for the transmission of about ten bits of information. These bits will generally include some error correction encoding to better assure an acceptably low error rate for the information transmitted by the user control channel 104.

In the downlink direction, the slot structure of user control channel 104 is relatively simple for base station 24 to implement. However, as will be apparent, in the uplink direction coordination of slot transmission timing must be achieved between multiple subscriber stations 28 which can be located within a relatively dispersed geographic area, such as subscriber stations 28 being located anywhere from a few hundred feet to ten miles or more from base station 24.

One approach to ensuring that the uplink user control channel 104 can deal with varying slot transmission timing of subscriber stations 28 is to provide guard times, as is typically employed with time division multiple access (TDMA) systems. Assuming a ten mile maximum distance between subscriber stations 28 and base station 24, and given a chip rate of 3.84 million chips per second, the maximum expected transmission path delay would equal about four hundred chips. Accordingly, a suitable guard band (such as five hundred chips) can be provided at the beginning of each slot and this will result in a decrease of about twenty percent (500/2650) in the transmission capacity of user control channel 104, or a reduction from five to four transmitted symbols per slot.

Another alternative in a CDMA-based system is to employ twice the number of user control channels 104 with only the even numbered slots of frames being used in one user channel 104 and only the odd numbered slots of frames being used in a second user channel 104 to provide guard bands. Such a configuration can avoid the loss of the twenty percent of the transmission capacity incurred in the example discussed above at the cost of adding some latency (about one frame on average) and requiring additional receivers at base station 24. As will be apparent to those of skill in the art, the unused slots do not necessarily have an adverse affect on the transmission capacity of system 20 as the unused slots are not interference in a CDMA system and thus do not utilize transmission capacity.

Yet another alternative is to determine the transmission path delay between subscriber stations 28 and base station 24. As mentioned above, subscriber stations 28 operate in a fixed or nomadic configuration and thus will not be subject to rapid changes in their position and/or, generally, the transmission path they experience. Accordingly, the transmission path delay for each subscriber station 28 can be determined by a suitable means, such as that described below, and a corresponding offset applied to the clock of each subscriber station 28 to synchronize the slot transmission timing in system 20 and reduce or eliminate the need for guard times.

One method of determining the transmission path delay between a subscriber station 28 and base station 24 is to determine the round trip delay therebetween and to divide that total delay in half. An originating station, either the subscriber station 28 of interest or the base station 24, can at appropriate intervals transmit a timing signal to the receiving station, the other of base station 24 or subscriber station 28. The receiving station will respond to the originating station by transmitting a timing signal, allowing the originating station to determine the round trip transmission delay between base station 24 and the subscriber station 28. This round trip delay can then be halved by the originating station, transmitted to the subscriber station 28 (if base station 24 was the originating station) and employed by the subscriber station 28 as an offset to correct its slot transmission time appropriately for its transmission path delay. It is contemplated that in this manner, the requirement for guard bands can be reduced or eliminated with the only cost being the transmission capacity required to transmit the intermittent timing signals and the processing power required to determine the transmission path delay therefrom.

Having described the overall uplink and downlink channel structures, the structure, operation and some uses of user control channel 104 will now be described in more detail.

Figure 4A:
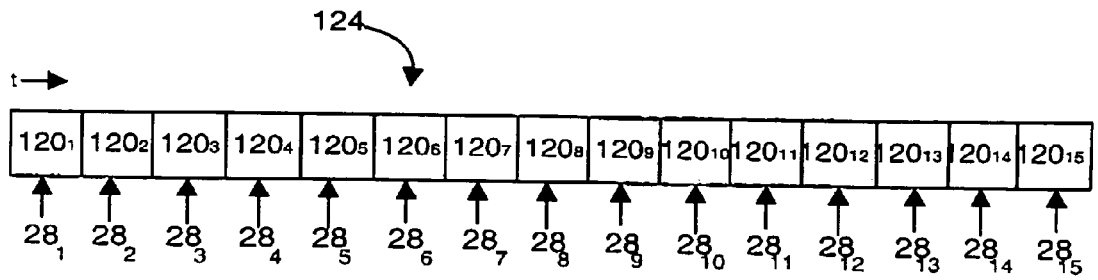
FIG. 4a shows a frame structure for a user control channel in accordance with an embodiment of the present invention.
Figure 4B:
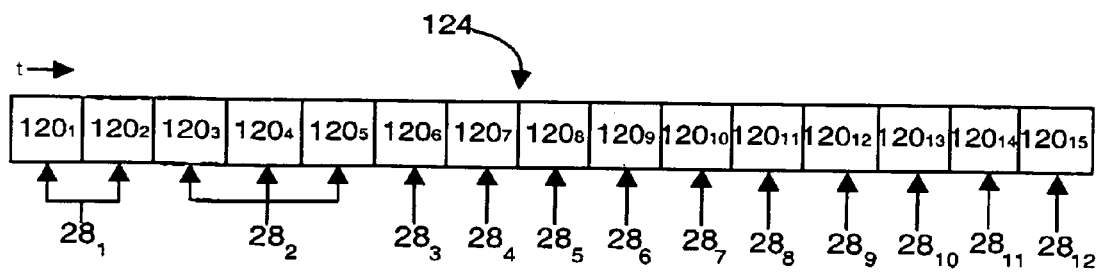
FIG. 4b shows another frame structure for a user control channel in accordance with an embodiment of the present invention.

FIG. 4a shows one configuration of a slotted frame for user control channel 104, with time t increasing from left to right of the Figure, wherein each slot $120_1$ through $120_{15}$ in a frame 124 is assigned to one of subscriber stations $28_1$ through $28_{15}$. FIG. 4b shows another configuration of user control channel 104 wherein some subscriber stations 28 have more than one slot 120 assigned to them. Specifically, slots $120_1$ and $120_2$ in frame 124 are assigned to subscriber station $28_1$, slots $120_3$, $120_4$ and $120_5$ are assigned to subscriber station $28_2$ and one of slots $120_6$ through $120_{15}$ is assigned to each of subscriber stations $28_3$ through $28_{12}$.

Figure 4C:
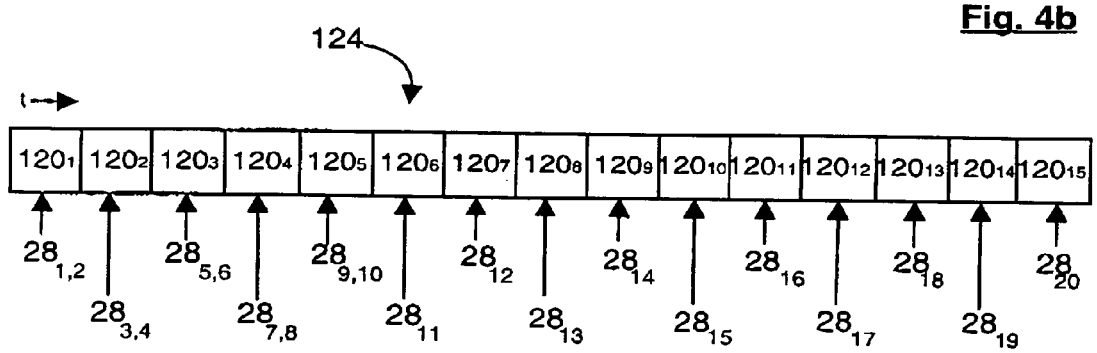
FIG. 4c shows another frame structure for a user control channel in accordance with an embodiment of the present invention.

FIG. 4c shows another configuration of user control channel 104 wherein some slots 120 are shared by more than one subscriber station 28. Specifically, slot $120_1$ is assigned to subscriber stations $28_1$ and $28_2$ which share it, slot $120_2$ is assigned to subscriber stations $28_3$ and $28_4$, which share it, etc. and subscriber stations $28_{11}$ through $28_{20}$ each have a slot assigned exclusively to them. As will be apparent, any slot can be assigned to one, two or more subscriber stations 28 and such shared slots are utilized by the subscriber stations 28 via a suitable sharing mechanism, such as by each subscriber station 28 employing the slot on a defined round robin basis (a first subscriber station 28 employs the slot 120 in a first frame 124 and a second subscriber station 28 employs the slot 120 in a second frame 124, etc.).

Figure 4D:
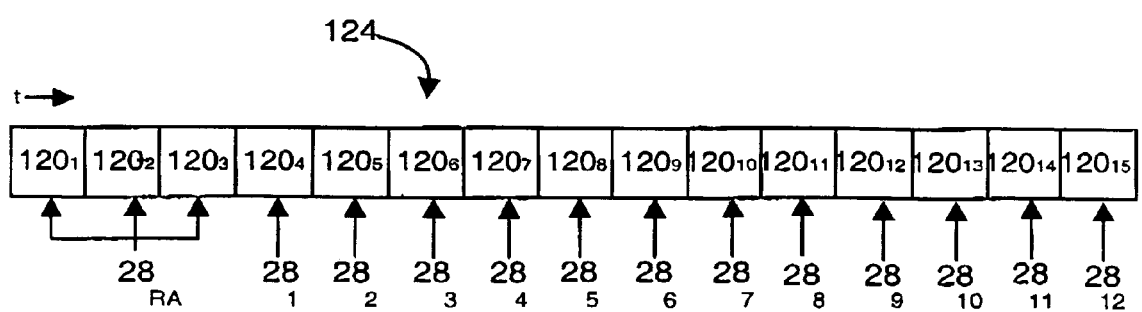
FIG. 4d shows another frame structure for a user control channel in accordance with an embodiment of the present invention.

FIG. 4d shows yet another configuration of a user control channel 104 wherein one or more slots 120 (slots $120_1$, $120_2$ and $120_3$ in the illustrated example) are designated as random access slots which can be used by subscriber stations 28 by employing a suitable random access protocol, such as an Aloha protocol. As is also illustrated, the remainder of slots $120_4$ through $120_{15}$ can be assigned to one, or more, subscriber stations 28.

As will now be apparent from the above, user control channels 104 allow for efficient use of transmission capacity in system 20 while providing relatively low data rate connections between subscriber stations 28 and base station 24. A connection can be maintained between base station 24 and subscriber stations 28 through a user control channel 104 at all times when a subscriber station 28 is operating normally and wherein there is no dedicated channel 100 assigned to it. When a dedicated channel 100 is assigned to a subscriber station 28, the subscriber station 28 will release the slot 120 of the user control channel 104 assigned to it, whether an exclusive or shared assignment.

If subscriber station 28 has been assigned a random access slot or slots (such as slots $120_1$, $120_2$ and $120_3$ in FIG. 4d), which typically are shared with other subscriber stations 28, system 20 can either have the subscriber station 28 release its use of these random access slots or merely cease using them when it is assigned a dedicated channel 100, although the former is presently preferred. It is contemplated that, in circumstances wherein the access of a subscriber station 28 is limited to random access slots 120, system 20 will attempt to ensure that no more than a predefined number of subscriber stations 28 are assigned to a set of random access slots. Thus, if a subscriber station 28 releases its access to such slots, system 20 can assign those slots to another subscriber station 28.

When a dedicated channel 100 is no longer needed by a subscriber station 28, a slot 120, or portion of a slot 120, or one or more random access slots in a user control channel 104 are assigned to subscriber station 28, preferably before the dedicated channel is released. The slot or slots 120 assigned to the subscriber station 28 can be different than slots 120 previously assigned to that subscriber station 28.

User control channels 104 can be used in a variety of manners within system 20. For example, user control channels 104 can carry a set of control signals, including closed loop power control signals and ACKs and NACKs for data packets transmitted over shared data channel 96. Other relatively low rate and/or low priority data and/or polled data, such as burglar alarm status or other data or information, can also be transmitted this way and this is an instance wherein a slot 120 in a frame 124 can be shared by more than one subscriber station as such data can be transmitted at a very low average data rate.

For example, it is contemplated that relatively small software or firmware upgrades for subscriber stations 28 can be performed through user control channel 104 and this is an instance wherein more than one slot 120 in a frame 124 can be assigned to a subscriber station 28 which will raise the average data transfer rate, when needed for such upgrades. It is contemplated that subscriber stations 28 can receive such upgrades on a rotating basis, with a first subscriber station 28 being assigned two or more slots 120 in a frame 124 until the transmission of upgrade data to it is completed. At this point the additional slots 120 that were assigned to the first next subscriber station 28 can be assigned to the next subscriber station 28 to be upgraded. In this manner, each subscriber station 28 can be upgraded, over time, without requiring an undue amount of network resources.

An important use for user control channel 104 is for power control. As is well known, the performance of CDMA-based telecommunication systems, such as IS-95 cellular systems, depends critically upon the ability of the system to control the transmission power at both the base station and the mobile stations. Transmissions from a mobile unit in a cell act as interference to the transmissions of each other mobile unit within the cell and transmissions from a base station act as interference to transmissions from base stations in adjacent cells. For multiple access to be achieved in an efficient manner, the signal of each mobile user should be received at the base station at the lowest power level at which the agreed quality of service for the connection can be achieved and each base station should transmit with the lowest transmission power it can.

Thus, controlling the transmission power within a CDMA system is an important factor in obtaining efficient use of the bandwidth and resources of the system. Two power control techniques are employed with IS-95 and other systems: (1) Open Loop power control; and (2) Closed Loop power control.

In open loop power control, the mobile unit measures the level at which a transmission signal from the base station is received and compares that level to the level at which the base station transmitted the signal (which is known to the mobile unit) to derive an estimate of the path signal loss. The mobile unit then adjusts its own transmission level appropriately.

Closed loop power control is used to compensate for fast fading, and the differences in path loss which could result between the uplink and downlink channels in FDD implementations, etc. Closed loop power control comprises the base station determining the actual received signal to noise ratio (SNR) from each mobile unit and instructing each mobile unit to increase or decrease its transmission power accordingly. In IS-95 systems, this power adjustment is performed eight hundred times a second and the power control signals are inserted into the data channel from the base station to the mobile unit by puncturing the signal transmitted to the mobile unit to include the power control signals.

While IS-95 systems and the like have worked reasonably well with mobile units, it is an expensive power control system, both in terms or the computational complexity required to implement the power control, especially the closed loop power control, and the amount of bandwidth (transmission capacity) required to send the closed loop power control signals. In the latter case, the puncturing which results from the transmission of the power control bits reduces the effective data rate between the base station and the mobile unit and/or increases the bit error probability for the signal.

In system 20, both open loop and closed loop power control information is transmitted via user control channel 104 when no dedicated channel is established between a base station 24 and a subscriber station 28. One advantage of this is that power control information is exchanged on an on-going basis in system 20 as base station 24 and subscriber stations 28 continuously, during normal operations, communicate via user control channel 104 (when no dedicated channel 100 is assigned). Thus, when a dedicated channel 100 is assigned to a subscriber station 28, relevant power control information is already available to base station 28 and the subscriber station 28 and a power-corrected communication can begin immediately. This allows a fast establishment of dedicated channels and can result in less interference to other subscriber stations 28 in a cell during that establishment. In contrast, in IS-95 and similar systems employing a random access channel (RACH) for connection set up, no power control information is initially available for the connection and can result in significant interference being present during connection set up in CDMA systems.

Another advantage of user control channels 104 in system 20 is that the rate of power control can be adaptive. Specifically, when subscriber stations 28 are fixed or nomadic units, they are not typically subject to the fast fading or other rapidly changeable path loss and power control issues applicable to mobile units. Accordingly, the present inventors have determined that power control in a CDMA telecommunications system, such as system 20 without mobile units, can employ a power control mechanism whose rate can be set as needed.

Specifically, adaptive power control refers to power control that is performed at a rate appropriate to the conditions experienced at each subscriber station 28. When no dedicated channel 100 is assigned to a subscriber station 28, power control can often be performed at a very low rate. When a dedicated channel 100 is assigned to a subscriber station 28, the rate at which power control is performed can be increased, if necessary, accordingly.

In one embodiment of the present invention, power control is implemented adaptively wherein the rate is changed in accordance with the rate at which conditions change at a subscriber station 28. Specifically, if no dedicated channel 100 is established to a subscriber station 28, then the reported SNR's from the subscriber station 28 is examined by base station 24 and an appropriate power control update rate is selected and forwarded to the subscriber station 28. For example, while a dedicated channel 100 is allocated to the subscriber station 100, a power control update rate of eight hundred times per second (eight hundred bits per second) may be employed. When the dedicated channel 100 is de-allocated, base station 24 can examine the last twenty SNR levels reported by the subscriber station 28 and, if the SNR's have not changed by more than a pre-selected amount (such as one db), referred to hereinafter as delta, through the twenty reported levels, then the base station can inform the subscriber station 28, through user control channel 104, that the power update rate will be halved to four hundred times per second. The process then repeats with the base station 24 examining the next twenty (lower rate) reported SNR's from the subscriber station 28.

If the delta is again not exceeded, the base station 24 can again reduce the rate and inform the subscriber station 28 through user control channel 104. This process can repeat until the power control reaches some predetermined minimum rate, such as four times a second.

If, at one iteration, the delta is exceeded within the twenty reported SNR's, the base station can determine by how much the delta was exceeded. If the delta was exceeded by more than a pre-selected value (such as two db), hereinafter referred to as epsilon, the base station 24 can instruct the subscriber station 28 to increase its power update rate and the process will then repeat as before with the base station 24 considering the next twenty reported SNR's. On the other hand, if the delta is exceeded by less than epsilon, base station 24 can maintain the same power update rate.

When a dedicated channel 100 is allocated to the subscriber station 28, base station 24 can continue to monitor twenty reported SNR's and adjust the power update rate accordingly, or, in a presently preferred embodiment, as part of the allocation process for dedicated channel 100, base station 24 immediately instructs the subscriber station 28 to increase its power update rate to a suitable rate, such as eight hundred updates per second.

It is also contemplated that adaptive rate power control can be employed even when a dedicated channel 100 is allocated to a subscriber station 28, where that subscriber station 28 is fixed or nomadic. In such a case, the process of reviewing a pre-selected number of reported SNR levels and adjusting the power control rate, described above, is also performed while a dedicated channel 100 is allocated to the subscriber station 28.

The present invention provides a novel user control channel for a wireless digital subscriber line system and the like, or other communications systems which can benefit from a control channel which provides a low data rate connection between stations on an ongoing basis and which makes efficient use of transmission capacity in the communications systems. The user control channel has a structure employing slotted frames, and a user can be assigned multiple slots, a single slot or less than a single slot (sharing slots with other users) to meet the data transmission needs of the user. Also, one or more slots can be designated as random access slots which users can access via an Aloha-like or other random access protocol as needed.

The present invention also provides a novel power control system for CDMA telecommunications systems wherein the rate of power updates can be changed, adaptively, as needed and up to date power control information is available, via the user control channel, to establish a dedicated channel between stations in an efficient manner.

The above-described embodiments of the invention are intended to be examples of the present invention and alterations and modifications may be effected thereto, by those of skill in the art, without departing from the scope of the invention which is defined solely by the claims appended hereto.

We claim:

1. A wireless communication system for communication between a base station and a plurality of subscriber stations comprising a channel structure for the plurality of subscriber stations to communicate with the base station, the channel structure including:

a plurality of bi-directional dedicated channels; and a bi-directional user control channel, wherein a first subscriber station, when activated within the communication system, is allocated a dedicated portion of the user control channel, but when a dedicated channel is established between the first subscriber station and the base station, then the dedicated portion of the user control channel is de-allocated from the first subscriber station until the dedicated channel is de-allocated from the first subscriber station.

2. The wireless communication system of claim 1, wherein the user control channel transmits data in frames divided into time slots and the dedicated portion of the user control channel includes a time slot in the frames transmitted over the user control channel.

3. The wireless communication system of claim 1, wherein power control information is transmitted via the user control channel.

4. The wireless communication system of claim 1, wherein firmware upgrades are transmitted via the user control channel.

5. The wireless communication system of claim 1, wherein the channel structure further includes a broadcast packet data channel and wherein acknowledgements for receipt of a packet from the broadcast packet data channel are transmitted from a receiving subscriber station to the base station via the user control channel.

6. A wireless communication system for communication between a base station and a plurality of subscriber stations, the system comprising a channel structure for the plurality of subscriber stations to communicate with the base station, the channel structure including:

a plurality of bi-directional dedicated channels; and at least one bi-directional user control channel, wherein a first subscriber station, when activated within the communication system, is allocated a portion of a user control channel, which portion is dedicated to at least the first subscriber station and less than all of the plurality of subscriber stations, but when a dedicated channel is established between the first subscriber station and the base station, then the portion of the user control channel dedicated to the first subscriber station is de-allocated from the first subscriber station until the dedicated channel is de-allocated from the first subscriber station.

7. The wireless communication system of claim 6, wherein the user control channel transmits data in frames divided into time slots and the portion of the user control channel that is dedicated to the first subscriber station includes a time slot in the frames transmitted over the user control channel.

8. The wireless communication system of claim 7, wherein the subscriber stations to which a time slot is dedicated share use of that time slot by alternately employing it in successive frames.

9. The wireless communication system of claim 7, wherein the time slot is designated as a random access slot for the subscriber stations to which it is dedicated.

* * * * *